United States Patent [19]

Morohasi et al.

[11] Patent Number: 5,029,084

[45] Date of Patent: Jul. 2, 1991

[54] JAPANESE LANGUAGE SENTENCE DIVIDING METHOD AND APPARATUS

[75] Inventors: Masayuki Morohasi, Tokyo; Shigeki Umeda, Kawasaki, both of Japan

[73] Assignee: International Business Machines Corporation, Armonk, N.Y.

[21] Appl. No.: 321,812

[22] Filed: Mar. 10, 1989

[30] Foreign Application Priority Data

Mar. 11, 1988 [JP] Japan .................................. 63-56507

[51] Int. Cl.$^5$ ............................................ G06F 15/38
[52] U.S. Cl. ................................. 364/419; 364/226.4; 364/900; 364/200
[58] Field of Search ..................... 364/200, 900, 419

[56] References Cited

U.S. PATENT DOCUMENTS

| | | | |
|---|---|---|---|
| 4,599,691 | 7/1986 | Sakaki et al. | 364/900 |
| 4,641,264 | 2/1987 | Nitta et al. | 364/419 |
| 4,821,230 | 4/1989 | Kumano et al. | 364/419 |
| 4,864,502 | 9/1989 | Kucera et al. | 364/419 |

Primary Examiner—Allen R. MacDonald
Assistant Examiner—Roger S. Joyner
Attorney, Agent, or Firm—Philip J. Feig

[57] ABSTRACT

A Japanese language sentence containing a word not registered in an electronic dictionary is divided by following a series of predetermined rules. When more than one division of such a sentence is possible, an evaluation is made in order to determine the best division of the sentence containing a word not registered in the dictionary.

10 Claims, 8 Drawing Sheets a : Character
b : Character type code
c : Division flag (ON: Divide after this)
d : Discard flag (ON: This character is discarded without being passed to the division executing section.)

| | Output of the division executing section | Shift register (4) (3) (2) (1) | Rule | Input text |
|---|---|---|---|---|
| 0. | | ☐ ☐ ☐ ☐<br>01 01 01 01 | | ----ソ連のミサイル攻撃の |
| 1. | | ☐ ☐ ☐ ソ<br>01 01 01 00K | K→Z | ----連のミサイル攻撃の0 |
| 2. | | ☐ ☐ ソ 連<br>01 01 00K 00J | KJ→2 | ----のミサイル攻撃の0. |
| 3. | | ☐ ソ 連 の<br>01 00K 00J 00H | JH→Z | ----ミサイル攻撃の0.5 |
| 4. | | ソ 連 の ミ<br>00K 00J 10H 00K | HK→X | ----サイル攻撃の0.5秒 |
| 5. | ソ<br>K | 連 の ミ サ<br>00J 10H 00K 00K | KK→Z | ----イル攻撃の0.5秒前 |
| 6. | ソ連<br>KJ | の ミ サ イ<br>10H 00K 00K 00K | KK→Z | ----ル攻撃の0.5秒前… |
| 7. | ソ連の I<br>KJH | ミ サ イ ル<br>00K 00K 00K 00K | KK→Z | ----攻撃の0.5秒前… |
| 8. | ソ連の I ミ<br>KJH  K | サ イ ル 攻<br>00K 00K 10K 00J | KJ→2 | ----撃の0.5秒前… |
| 9. | ソ連の I ミサ<br>KJH  KK | イ ル 攻 撃<br>00K 10K 00J 00J | JJ→Z | ----の0.5秒前… |
| 10. | ソ連の I ミサイ<br>KJH  KKK | ル 攻 撃 の<br>10K 00J 00J 00H | JH→Z | ----0.5秒前… |
| 11. | ソ連の I ミサイル I<br>KJH  KKKK | 攻 撃 の 0<br>00J 00J 10H 00N | HN→3 | ----.5秒前… |
| 12. | ソ連の I ミサイル I 攻<br>KJH  KKKK  J | 撃 の 0 .<br>00J 10H 10N 00D | ND→X | ----5秒前… |
| 13. | ソ連の I ミサイル I 攻撃<br>KJH  KKKK  JJ | の 0 . 5<br>10H 00N 00N 00N | DN→4 | ----秒前… |
| 14. | の I ミサイル I 攻撃の I<br>H  KKKK  JJH | 0 . 5 秒<br>00N 00N 00N 00J | NJ→Z | ----前… |

Fig. 4

Clause

| 誤 | — 誤差、誤差（の） |
| 差 | — |
| の | — 〔の伝〕 |
| 伝 | — 〔伝搬〕、〔伝搬〕（に）、〔伝搬〕（について）、〔伝搬〕（についても） |
| 搬 | — 〔搬に〕、〔搬につ〕 |
| に | — 〔につ〕〔につい〕、につ（いて）、につ（いても） |
| つ | — つい、つ（いて）、ついて、つ（いても）、ついて（も） |
| い | — い（て）、いて、い（ても）、いて（も） |
| て | — 〔ても〕 |
| も | — |

JAPANESE LANGUAGE SENTENCE DIVIDING METHOD AND APPARATUS

FIELD OF THE INVENTION

The invention relates to a Japanese language sentence dividing method and apparatus for dividing a Japanese language document in electronic form into individual words, and particularly, to performing the word division without any difficulty when the document contains words which are not contained in a dictionary (i.e. unregistered words).

The Japanese language sentence dividing method and apparatus of this invention apply, for example, to the following applications: automatic keyword extraction in a document retrieval system; the main processing sections of a Japanese KWIC (Keyword In Context) system or a Japanese document correction support system; the sentence analyzing section of a system for reciting and verifying sentences by a voice synthesizing machine; the sentence analyzing section of a system for converting sentences into Kana braille points; the preprocessing section of the Japanese parsing program of a system of machine translation from the Japanese language or a system of database retrieval in the Japanese language; and analyzing means for the basic study of analyzing Japanese linguistic phenomena (for instance, a word segmenting tool for vocabulary research for determining the contents of the dictionary required in a Kana-Kanji conversion).

BACKGROUND OF THE INVENTION

Prior art sentence dividing techniques are generally classified into the following four types:

(1) Division by kind of character

A change of character types such as Kanji, Katakana or Hiragana is used for making the judgment at the time of dividing. With only this information, 84% of the correct divisions can be accomplished (Sakamoto, "Recognition of a Clause", Collection of Reports of the Japanese Information Processing Symposium, July 17-20, 1978, pp. 105-111, The Information Processing Society). However, this is usually utilized as the preprocessing or part of the following techniques. That is, after a text is roughly segmented with this approach, the segmented pieces are analyzed in more detail. By this preprocessing, the unit of the subsequent analysis can be short, thereby making possible the shortening of the processing time. However, in the case of incorrect divisions, segmentation at a wrong place seriously affects the subsequent processing, so these kinds of errors must be prevented, or corrected later. This approach does not provide for detailed analysis and division as in the present invention.

(2) Division by a word dictionary

Most of the currently published systems are of this type (Nagao et al., "Storage of a National Language Dictionary and Automatic Division of a Japanese Sentence", Information Processing, Vol. 19, No. 6, June 1978). In this technique, in order to improve the divisional precision, it is always necessary to complete or add to the contents of the dictionary in compliance with a text to be parsed (mainly, addition of new words) and to change the program in compliance with the algorithms on the application of words.

In either technique, the greatest disadvantage is that the dictionary and the algorithm depend on the field to which they apply and maintenance continues forever for both the dictionary and the program. There is also a method in which several kinds of dictionaries are prepared to eliminate the burden of the program change, this will make the system maintenance difficult because of complex interrelation of the effects among the dictionaries.

(3) Division by the Nature of Kanji

It is almost impossible to register all the words used in the Japanese language in a dictionary, but it may be possible to register most of the Kanji characters used. Noting this point, there is a technique for division which uses a dictionary in which the use and reach of each Kanji character in words are described in conjunction with the characters occurring before and after it (Takano, Araki, Kaneko, Hinatsu, "A Japanese Keyword Automatic Extraction System (JAKAS)". The Collection of The 18th Information Science and Technology Study Conference, pp. 35-44, 1981). Using this technique, the entries of the dictionary can certainly be reduced to a relatively small number. However, since the meaning possessed by each Kanji character is not so general as the part of speech of a word, the past accumulation of lexical knowledge such as in a dictionary for Japanese language can not be directly utilized. Therefore, it is unclear whether the information in the dictionary works well for texts other than the titles of the science and engineering literature attempted in the reference.

(4) Division by statistical information of character chain

This is a technique by which the immediately above method is implemented using a statistical approach (dynamic programming). (Fujisaki, "Unit Segmentation and Kana Allocation of a Writing in Kanji and Kana by Dynamic Programming", Information Processing NL Study, Natural Language 28-5, Nov. 20, 1981). Since provision of the information to be possessed by each Kanji character is automatically done (by using probability statistics) if a large quantity of texts are available, it is unnecessary to spend much time maintaining the dictionary. However, at the present time, there is the problem of how to collect a large quantity of electronized texts to attain sufficient precision. Also, this technique has a drawback in that it is difficult to predict what and how many texts must be collected to attain a certain precision, and what kinds of errors are reduced as the precision of the dictionary increases.

SUMMARY OF THE INVENTION

The present invention provides a Japanese language sentence dividing method and apparatus which overcome the problems and limitations in the above described techniques.

The present invention is particularly adapted to handle the case in which words not contained in a dictionary (i.e. unregistered words) appear in a sentence by applying an unregistered word deduction rule to the division process in addition to using a word dictionary.

That is, the division is basically performed using a word dictionary, and when an unregistered word is encountered, the character string including the unregistered word is temporarily divided in various ways, the divided partial character strings are matched with words in the word dictionary, and a probable division is determined on the basis of the number of characters in the matched partial character string.

In a particular example, the word division is first performed by means of the longest-match method using a content word dictionary and a connection table of function words. The principle of the longest-match is applied with respect to content words and function word strings. As a preferred technique for examining the connection between content words and function words, the one used in the Kana-Kanji conversion is directly employed. If there is a word which is not contained in the dictionary, a parsing including unregistered word deductions is conducted before and after that word. This parsing is such that, regarding one parsing unit, the partial character strings of arbitrary lengths starting from all the places where the parsing units appear are listed as word candidates, and the division which provides the highest evaluation among all the combinations of partial character strings is assumed to be the result of the parsing. However, since it is useless to take the partial character strings of arbitrary lengths starting from all places (candidates of a word starting with " ん(n)" cannot exist), an initial restriction is provided on the combinations of the characters constituting a word.

To conduct the longest-match parsing and the parsing of unregistered word deduction, it is preferable for a parsing unit as the object thereof, to be as short as possible. Thus, as in preprocessing, an inputted sentence is divided by character kind or comparison with function word strings, thereby enhancing the parsing efficiency.

The division by character types roughly divides a Japanese language sentence by the use of the rules of the Japanese word division (for instance, a word division takes place in a change from Hiragana to Kanji, before and after a punctuation mark, etc.). In order to avoid dividing at places where no division should occur, it is determined whether or not a division is carried out according to the character type information up to the division and to the last four characters.

The division by comparison with the function word strings provides a more detailed division of the units (segments) divided by character kind by using the dependent word strings included therein as criteria The function word strings used here are limited to those which can be divided immediately afterward (i.e. manually selected, and mechanically checked).

In words which are obtained by means of the parsing, including the longest-match by a dictionary and the unregistered words deduction, the word base of a compound word [such as "冷房完備" (Reibo Kanbi)], prefixes ["前首相" (Zen-Shusho), "大災害" (Zen-Shusho), (Dai-Saigai) and the like], suffixes ["最終的" (Saishu-Teki), "適用外" (Tekiyo-Gai) and the like], inflectional endings ["作る" (Tsuku-Ru, "返さない")" (Kae-Sa-Nai) and the like], and derivatives ["美しさ)" (Utsukushi-Sa), "作れる" [Tsuku-Re-Ru) and the like] are treated as independent words. The compound word synthesizing rule, which collects the word base, prefixes, suffixes, inflectional ending and derivatives together with the words located before and after the collected words to make ordinary word units or compound word units, functions to provide as the output a final result.

A primary object of the present invention is, therefore, the provision of a Japanese language sentence dividing apparatus and method for dividing an electronized Japanese language document into individual words even when the sentence contains words not contained in an associated dictionary.

Another object of the invention is the provision of a Japanese language sentence dividing apparatus and method for dividing a Japanese language sentence into words and assigning a part of speech to the words using only a general-purpose dictionary, without registering terms used depending on the field of a document to be analyzed.

Further and still another object of the invention will become more clearly apparent when the following description is read in conjunction with the accompanying drawings.

BRIEF DESCRIPTION OF THE DRAWINGS

FIG. 4 is a diagram showing an example of the division process in FIG. 2;

DETAILED DESCRIPTION

Figure 1:
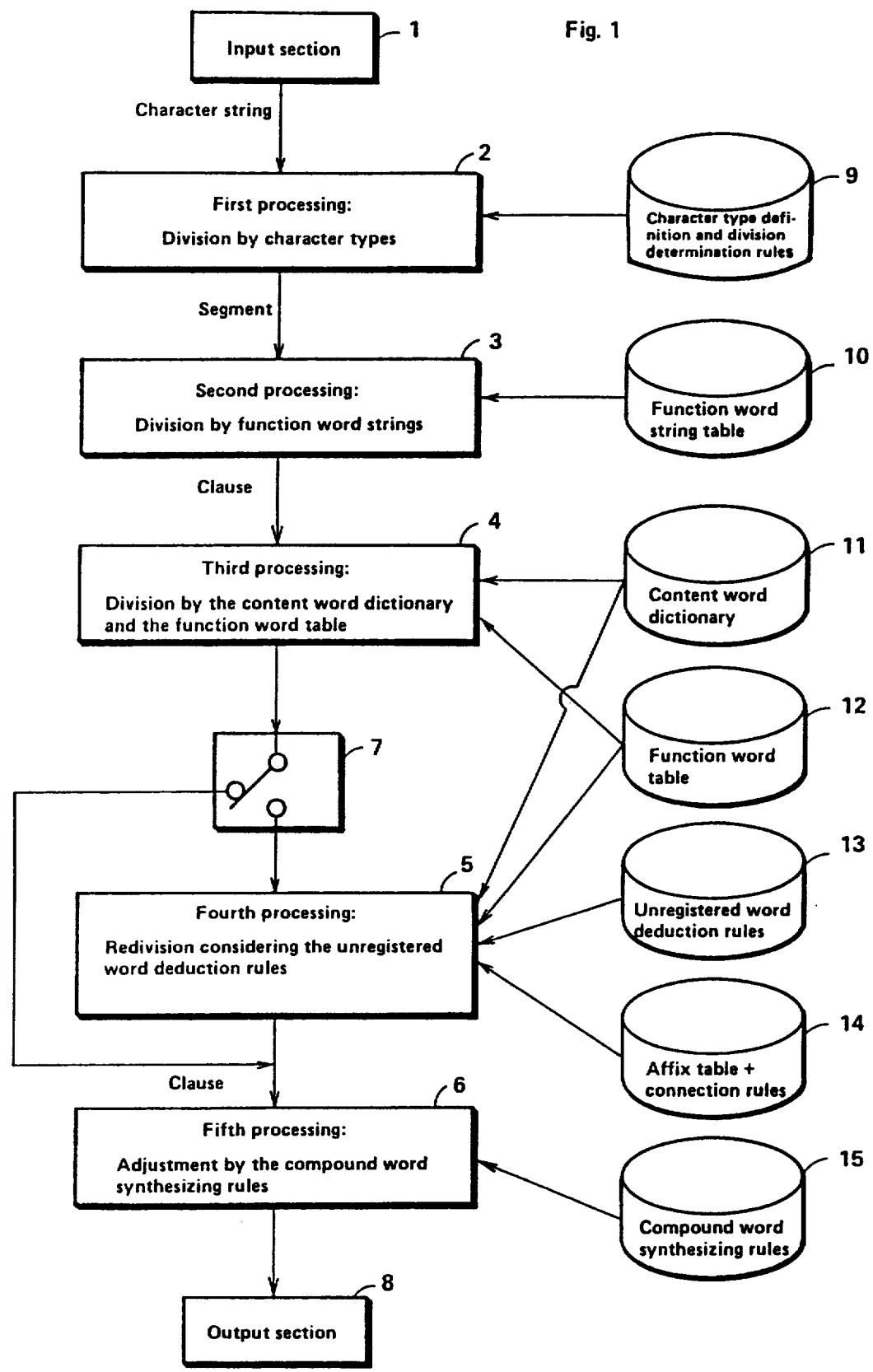
FIG. 1 is a schematic block diagram of a preferred embodiment of the invention.

Referring now to the figures and to FIG. 1 in particular, there is shown schematically a preferred embodiment of the invention. In FIG. 1, the Japanese language sentence dividing apparatus comprises an input section 1, first to fifth processing sections 2, 3, 4, and 6, a switching section 7, an output section 8, and first to seventh memory sections 9, 10, 11, 12, 13, 14 and 15 for storing a dictionary, tables, rules, and the like. The input section 1 receives an input text to be divided, performs a predetermined preprocessing (for instance, converting to a 2-byte uniform code), and supplies the preprocessed text to the subsequent, first processing section 2. The first to fifth processing sections 2-6 in subsequent stages perform the processing described hereinafter.

The first processing section 2 performs the step of division by character types. The second processing section 3 performs the step of division by function word strings. The third processing section 4 performs the step of division by a content word dictionary and a function word table. The fourth processing section 5 performs the step of subdivision using unregistered word deduction rules. The fifth processing section 6 performs the step of adjustment by compound word synthesizing rules.

In these first to fifth processing sections 2-6, the first to seventh memories 9-15 are used. The contents of the data in the first to seventh memories 9 -15 are as shown in the corresponding blocks in FIG. 1. Memory 9 contains character type definitions and division determination rules. Memory 10 contains a function word string table. Memory 11 contains a content word dictionary. Memory 12 contains a function word table. Memory 13 contains unregistered word deduction rules. Memory 14 contains an affix table and connection rules. Memory 15 contains compound word synthesizing rules.

The words obtained by the division in the first to fifth processing sections 2-6 are provided as an output via the output section 8.

The processing in the first through fifth processing sections 2-6 will now be described.

DIVISION BY CHARACTER TYPES (FIRST PROCESSING SECTION 2)

Figure 2:
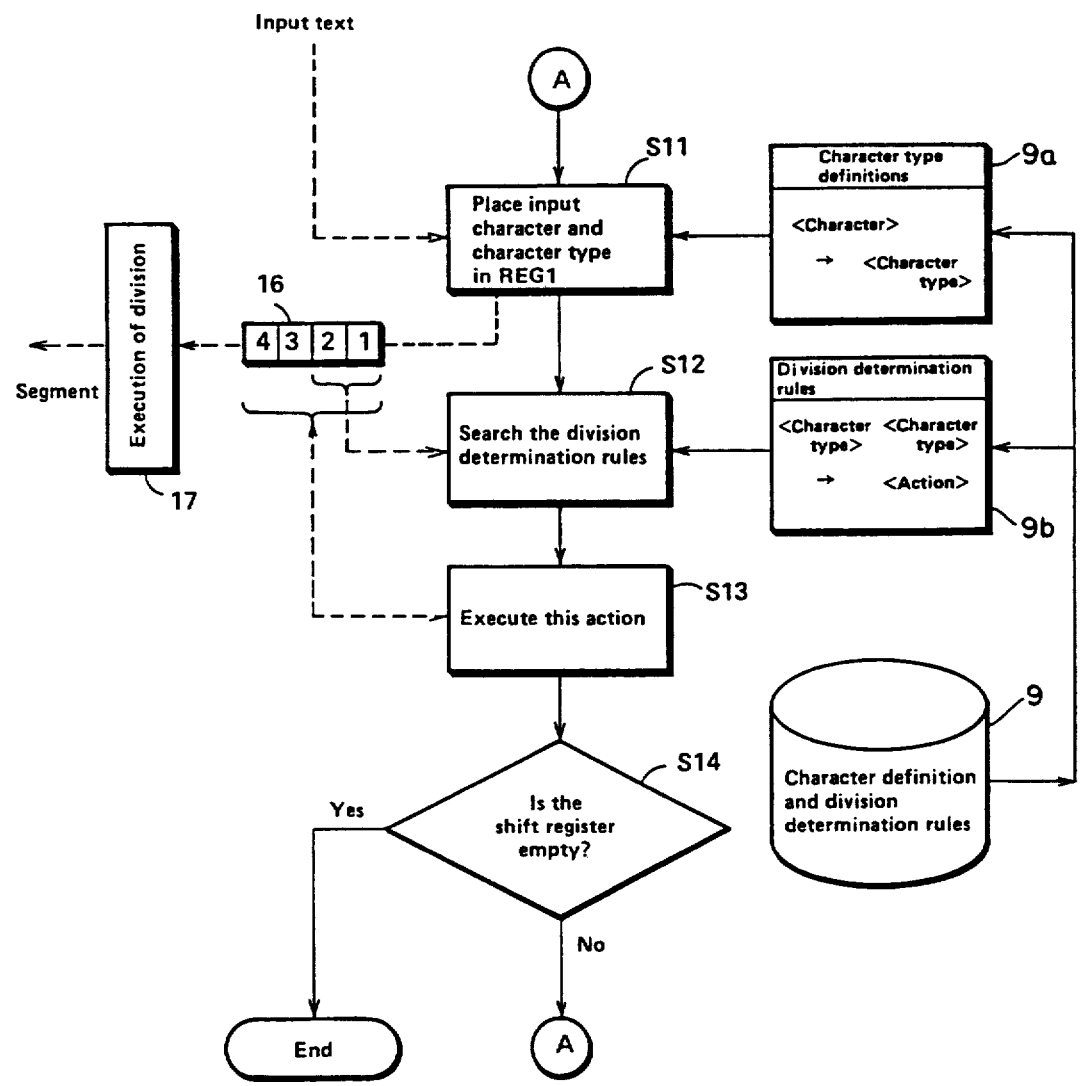
FIG. 2 is a schematic diagram showing the division process by character type of the first processing section 2 of the embodiment in FIG. 1.

FIG. 2 shows the processing of the first processing section 2 in detail. In FIG. 2, the character type definitions 9a and the division determination rules 9b comprise and are stored in the first memory 9. The character type definitions define the character types for all machine readable characters. The character types are as shown in Table 1, which are represented hereafter using symbols.

In order to make the parsing more universal, special character types are also prepared in this example in addition to the character types which are more commonly used.

TABLE 1
Character Type Codes

A: Alphabet, European characters
   Example: A, a, α, etc.
N: Numeric
   Example: 2, 四 (four), iv, etc.
K: Katakana
   Example: カ, ヴ, ７, etc.
H: Hiragana
   Example: あ, ば, ぁ, etc.
J: Kanji
   Example: 荻, 町, ／, etc.
I: Special character 1
   (One this character per se constitutes one word.)
   Example: , /, , etc.
S: Special character 2
   (One word is constituted by one this character per se, or provided that the same character continues.)
   Example: =, *, etc.
D: Special character 3
   (Processing depends on the context. Equivocal character.)
   Example: . (Decimal point, period),
            – (Minus, hyphen, etc.)
B: Blank character
L: Special character indicating the line end
NUL: Special character indicating the initial state or EOD (end-of-data)

Figure 3:
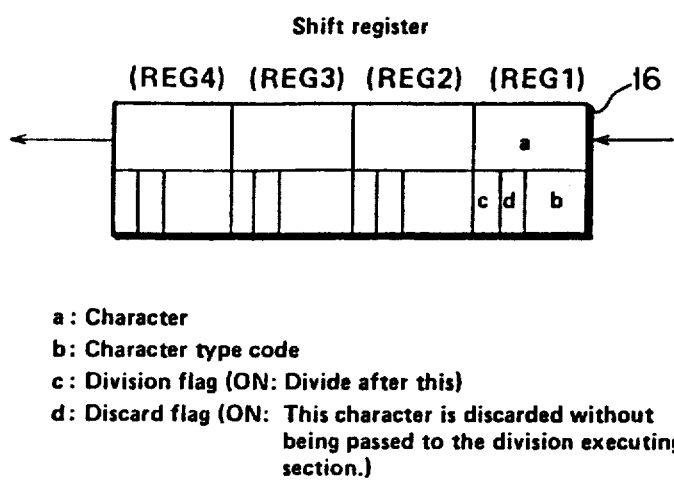
FIG. 3 is a schematic diagram showing the construction of a shift register 16 in FIG. 2.

The division determination rules are applied using a shift register 16 as shown in FIG. 3 comprising first to fourth registers REG1-REG4. The dashed lines in FIG. 2 represent the flow of an input text and the processings to the input text. A division determination rule executes a predetermined action on the basis of the character types of two consecutive characters. To illustrate, >character type of the former character> <character type of the latter character>→<Action>. This rule is shown in Table 2. In Table 2, if Katakana comes after Hiragana, <H><K>→<X>. <X> is the action of turning ON the division flag of the register REG2, which indicates that a division point is to be inserted at that location.

In the first processing portion of FIG. 2, first, one incoming character and its character type are transferred to the register REG1 (step S11). At this time, the character type definitions in memory 9a are referred to. Next, the corresponding division determination rule in memory 9b is selected on the basis of the character type pattern of the registers REG1 and REG2 (step S12) in order to apply the suitable action, and then the determined action is executed to correct the contents of the registers REG1 to REG4 (step S13). Thereafter, it is determined whether the registers REG1 to REG4 are empty (step S14). The processing is terminated if the registers are empty; otherwise, the processing is repeated A division flag and discard flag are provided in REG1, and a division is executed in a division execution section 17. A unit of the output of the division is referred to as a segment.

FIG. 4 shows, as an example, how to divide the phrase "ソ連のミサイル攻撃の0.5 秒前....." (0.5 seconds before the Soviet's missile attack .....).

TABLE 2
Actions Determined by Character Type

| After Before | A | N | K | H | J | I | S | D | B | L | NUL |
|---|---|---|---|---|---|---|---|---|---|---|---|
| A | Z | Z | X | Z | X | X | X | X | W | W | V |
| N | Z | Z | Z | Z | Z | X | X | X | W | U | V |
| K | X | Z | Z | X | 2 | X | X | X | W | U | V |
| H | X | 3 | X | Z | Z | X | X | X | W | U | V |
| J | X | 2 | Z | Z | Z | X | X | X | W | U | V |
| I | X | X | X | X | X | X | X | X | W | U | V |
| S | X | X | X | X | X | X | 1 | X | W | U | V |
| D | 5 | 4 | X | X | X | X | X | 1 | W | U | V |
| B | Z | 2 | Z | Z | Z | Z | Z | Z | W | U | V |
| L | Z | Z | Z | Z | Z | Z | Z | Z | W | U | V |
| NUL | Z | Z | Z | Z | Z | Z | Z | Z | Z | U | V | where
U: Discard the contents of the register REG1 (turn the discard flag ON)
V: Turn the division flags of the registers REG2 and REG1 ON
W: Turn the discard and division flags of the register REG1 ON
X: Turn the division flag of the register REG2
Z: No operation
1: Do "Z" if the character of the register REG 2 = the character of the register REG1; otherwise do "X".
2: Do "Z" if the character type of the register REG3 ≠ the character type of the register REG2; otherwise do "X".
3: Do "Z" if the characters of the registers REG3 and REG2 = "まっ"; otherwise do "X".
4: Do "Z" if the character types of the registers REG3-REG1 are "NDN"; otherwise do "X".
5: Do "Z" if the character types of the registers REG3-REG1 are "ADA" otherwise do "X".

DIVISION BY FUNCTION WORD STRINGS (SECOND PROCESSING SECTION 3)

The second processing section 3 further divides the segments obtained by dividing the input text on a character type basis in the first processing section 2, on the basis of the function word string table shown in Table 3. The divisional result here is called a clause. The function word string in Table 3 is stored in the second memory section 10 (FIG. 1). In this division, the input character string is collated with the character patterns of the function word strings of Table 3, and the division is performed just after the matched portion.

For example, a segment "文献検索において索引語等の二次情報を自動付与することは情報提供の迅速化を図ることになろうが" matches the dependent word strings in the underlined portions and, as a result, clauses of "文献検索において", "索引語等の二次情報を", "自動付与することは情報提供の迅速化を", "図ることになろう" and "が" are generated.

TABLE 3

| Function Word String Table | |
|---|---|
| を | (o) |
| および | (oyobi) |
| からすれば | (karasureba) |
| かどうか | (kadoka) |
| なった | (natta) |
| なって | (natte) |
| なかった | (nakatta) |
| なければならない | (nakerebanaranai) |
| なければ | (nakereba) |
| にあって | (niatte) |
| において | (nioite) |
| にとって | (nitotte) |
| によって | (niyotte) |
| にわたって | (niwatatte) |
| にわたり | (niwatari) |
| ることになろう | (rukotoninaro) |
| るだろう | (rudaro) |
| であった | (deatta) |
| であろう | (dearo) |

Figure 5:
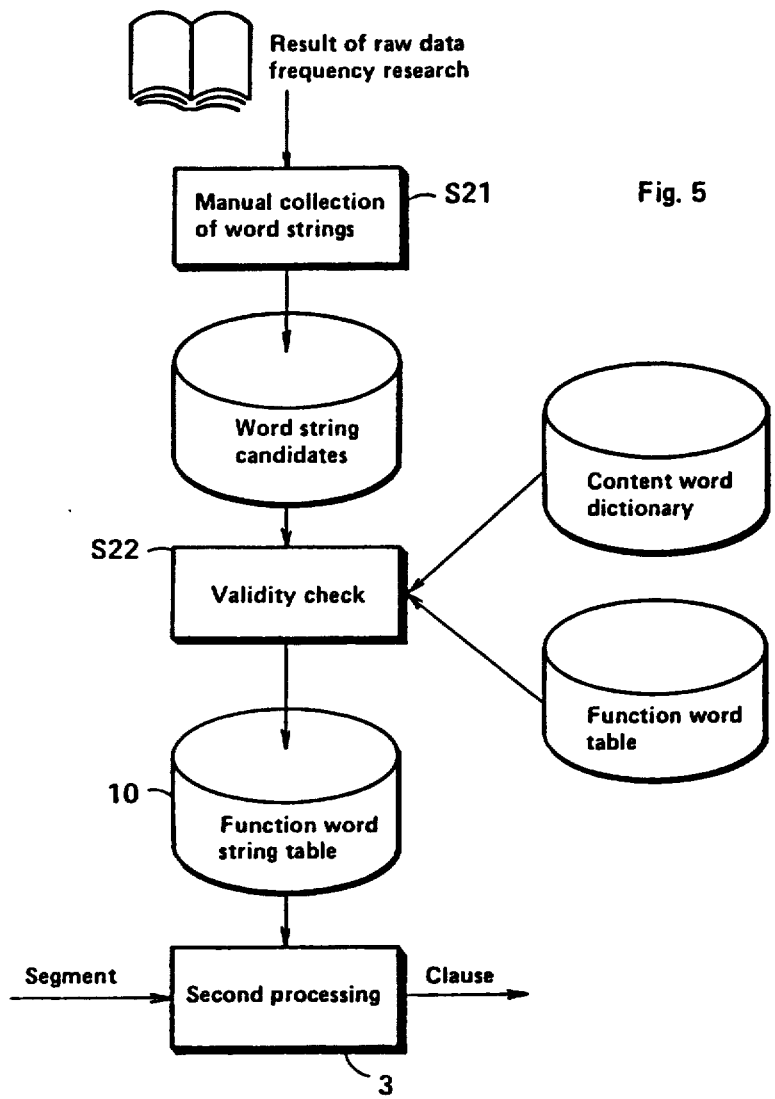
FIG. 5 is a schematic diagram showing the creation of the function word string table which is used in the division by function word strings.

The function word strings of Table 3 can be created as illustrated in FIG. 5.

The function word strings utilized for division must be selected from both an economical (frequently appear in texts) and an accuracy (not resulting in a wrong segmentation) point of view. In order to fulfill the condition of economy, function word strings appearing frequently are chosen as the candidates from the result of a lexical research, such as a function word string frequency table, actual newspaper articles and the like (step S21). Then, the following procedure is employed for determining whether or not these word strings meet the condition of accuracy (step S22).

First, conduct the connection analysis of function words for each candidate. This analysis directly utilizes the connection examination routine which is used in the third processing section 4 for finding locations which can be divisions of clauses. A location can also be considered as the beginning of a content word.

Example: が(ga)・て き(deki)・て(te)

す(su)・る(ru)・こ と(koto)・に(ni)・ な ろ う(narou)

Second, if, of the divided pieces, the rightmost piece does not have more than two characters, it is not adopted for the function word string table [character strings beginning with "っ" (tsu), and "を" (o) are exceptions]. The reason for this rule is that a Hiragana character string within two characters has a very high possibility of being a beginning part of a content word written in Hiragana characters.

Example: As the rightmost character string "て" of the above example "が"·

て き・て" meets this condition, it is not adopted for the function word string table.

Third, a character string having three or more characters is adopted for the function word string table in principle. However, the character string needs to be checked to assure that the string does not match the beginning of any content word which can be written in Hiragana characters.

Example: The rightmost character string "なろう" of the first example above "す・る・こ と・に・なろう" can be employed in the function word string table since no content word "なろう . . . " exists.

Fourth, a check is made to assure that the whole function word string does not match the beginning of any content word.

Example: "(な)かつた" [(na) katta] can be analyzed to be "か・つた" (ka·tta) and satisfy the above rules, but, since it also matches the beginning of a content word "かつたるい" (kattarui), it cannot be employed in the table.

For the function word strings collected as described above, the following check is finally made in terms of efficiency.

In arbitrary two function word strings "a", "b" of the collected function word strings [length of "a": 1(a) length of "b": 1(b)], if the right 1(a) characters of "b" is equal to "a", "b" is deleted from the table ["a" ="なろう" (narou) and "b" = "になろう", (ninarou) is an example of this case].

This manipulation is required because, if "b" is used for dividing a text, "a" can always be used as well and "b" is unnecessary since the text is divided at the same place.

To perform this manipulation efficiently, the dependent word strings are first arranged inversely with respect to the left and right ("なろう"→"うろな"). If the word strings are sorted in the ascending order of the code and matching of the two consecutive strings is sequentially checked from the top, it is unnecessary to examine every pair of word strings.

DIVISION BY THE LONGEST-MATCH METHOD USING A CONTENT WORD DICTIONARY AND A FUNCTION WORD TABLE (THIRD PROCESSING SECTION 4)

A processing unit, having undergone the division by collation with the function word string table in the second processing section 3, is further divided. A clause is considered to be a series of phases. There are three types of phrases.

Type 1: Those consisting only of a content word plus a function word string

Type 2: Those consisting only of a content word (except for those consisting only of the stem of a verb)

Type 3: Those consisting only of a function word string.

Content words are basically the words found in the parsing dictionary. However, a row of the same character types but in Kanji and Hiragana is also considered to be a content word ("big" of "big なEさ").

Regarding the function word table, a table defining connectable relations between 96 parts of speech of all the Japanese words classified by Okochi (The Information Processing Society Journal, Vol. 24, No. 4, pp. 389–396) can also be used.

Division by the longest-match method is well known, so the detailed explanation thereof is omitted. In brief, the longest-match method is performed by connecting function words to a content word so that the clause becomes as long as possible.

Figure 6:
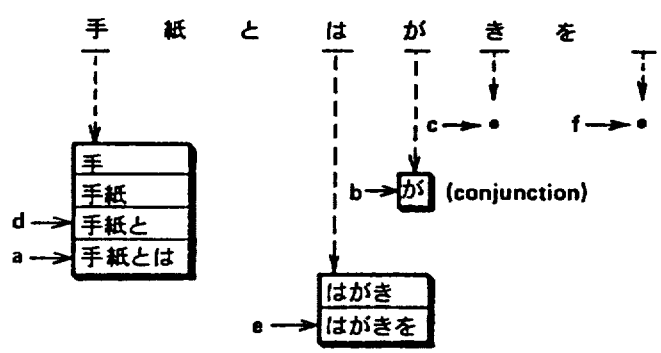
FIG. 6 is a diagram showing a divisional example of the longest-match method executed in the third processing section 4 of the embodiment in FIG. 1.

An example of division by the longest-match method is shown in FIG. 6. The clauses beginning with the leftmost character of the example clause "￦" (Te)

"手紙" (Tegami), "手紙と" (Tegamito) and "手紙とは" (Tegamitowa) are found first. According to the principle of the longest-match, division is proceeded with while recognizing "手紙とは" as the first clause (a). Then, clauses are searched for with respect to the character string beginning with (ga). A conjunction "が" is found as a clause (b). Subsequently, clauses are searched for with respect to the character string beginning with "き" (ki), but none is found (c). After returning to the clause farthest to the left by backtracking, "手紙と" is chosen as a new clause and division is resumed (d). After this, the processing will reach the right end by selecting the longest one from the clauses found (d, e, f). As a result, a preferred division "手紙と|はがきを" is obtained.

DIVISION USING THE UNREGISTERED WORD DEDUCTION FUNCTION (FOURTH PROCESSING SECTION 5)

Figure 7:
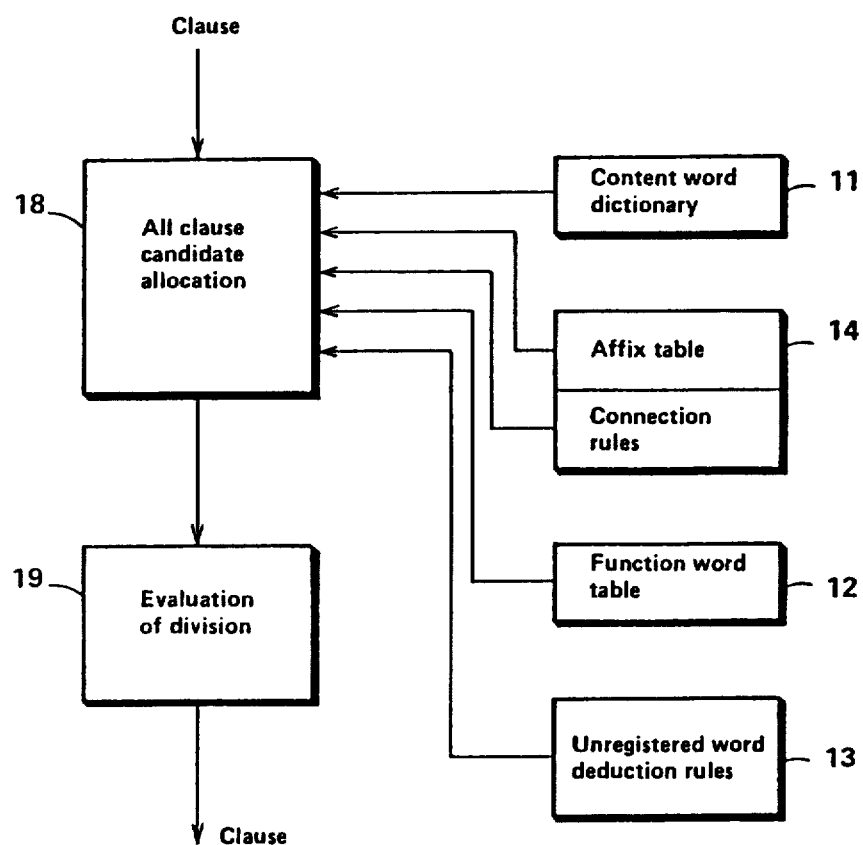
FIG. 7 is a schematic diagram showing the detail of a redivision using the unregistered word deduction rules of the fourth processing section 5 of the embodiment in FIG. 1.

The processing is performed here only for those clauses which failed to be divided in the third processing section 4 because they have words which are not found in the dictionary (unregistered words). The fourth processing section 5 generally comprises two sections as shown in FIG. 7, an all divisional candidate allocation section 18 and a divisional candidate evaluation section 19. In the all divisional candidate allocation section 18, all candidates are found by the use of a content word dictionary memory 11, an affix table including the rules for connecting affixes memory 14, a function word table memory 12 and the unregistered word deduction rules memory 13.

The affix table provides the condition for connection with an adjoining content word and the code of a part of speech with respect to prefixes and suffixes and has the same structure as the content dictionary. There are three types of affixes for ordinary words, numerical characters and proper nouns, which are connected to the corresponding nouns, respectively. Even if every partial character string in a clause is considered to be an unregistered word, the next evaluation section 19 functions, but in consideration of efficiency, the unregistered word deduction rules are introduced in order to reduce the number of unregistered words. The unregistered word deduction rules describe the character patterns of "content words comprised by Kanji and Hiragana characters", and include a rule assuming English words and a rule assuming Japanese content words consisting of Hiragana characters. These are shown in Table 4.

TABLE 4

| Unregistered Word Deduction Rules | |
|---|---|
| Rules | Example |
| 漢 + 漢 | 胡椒, 愛敬 |
| 漢数字 + 漢 + 漢数字 + 漢 | 三寒四温 一罰百戒 |
| 漢 + 漢 + 「男」 | 通年男 |
| 漢 + 漢 + 「夫」 | 寿々夫 |
| 漢 + 漢 + 「子」 | 未来子 |
| 漢 + ひ | 残し [残滓] |
| 漢 + ひ + ひ | 団らん [団欒] |
| Those meeting the rule for reading Kanji characters phonetically | 僧りょ [僧侶] |
| 漢 + ひ + ひ + ひ | 卓きょう [卓佳] |
| Those meeting the rule for reading Kanji characters phonetically | 飛をやく [飛躍] |

TABLE 4-continued

| Unregistered Word Deduction Rules | |
|---|---|
| Rules | Example |
| ひ + 漢 | ひ免 [罷免] |
| ひ + ひ + 漢 | たん白 [蛋白] |
| Those meeting the rule for reading Kanji characters phonetically | |
| ひ + ひ + ひ + 漢 | しゅん動 [蠢動] |
| Those meeting the rule for reading Kanji characters phonetically | しょう酸 [硝酸] |
| ひ + ひ + ··· except for the string beginning with ん,を,や,ゆ,よ,っ | きっぱり たまさか |

Note: "漢" (kan) represents a Kanji character and "ひ" (hi) represents a Hiragana character.

In the divisional candidate evaluation section 19, the divisional candidate that has the largest value according to the following evaluation formula is determined to be the best division from the divisions found in the all divisional candidates allocation section 18.

V = (Maximum number of clauses − Number of the clauses in this division) × (Number of all the characters of phrases − Total number of the characters of the unregistered words)

In this formula, the "maximum number of clauses" and the "number of all the characters of phrases" are constants in order to maximize the value of the evaluation formula and to suppress the number of clauses (the first term of the formula) to a minimum so as to find the division minimizing the length of the unregistered word. However, as it is cumbersome to determine the maximum number of clauses before entering the evaluation, in order to simplify matters, a bit string as described in the following example is utilized to obtain an approximate value for the number of clauses while determining the actual number of clauses, and use the appropriate value for the evaluation formula.

If the values of the evaluation formula are equal, a division is adopted in which a longer clause appears first when viewed from the left to the right.

Divisional evaluation values are basically calculated for all possible divisions, but, if it is found during the calculation that the past maximum value will not be reached (the current number of clauses exceeds "maximum number of clauses−Vmax÷all the characters of phrases"), then the calculation is stopped.

EXAMPLE

Figures 8, 9:
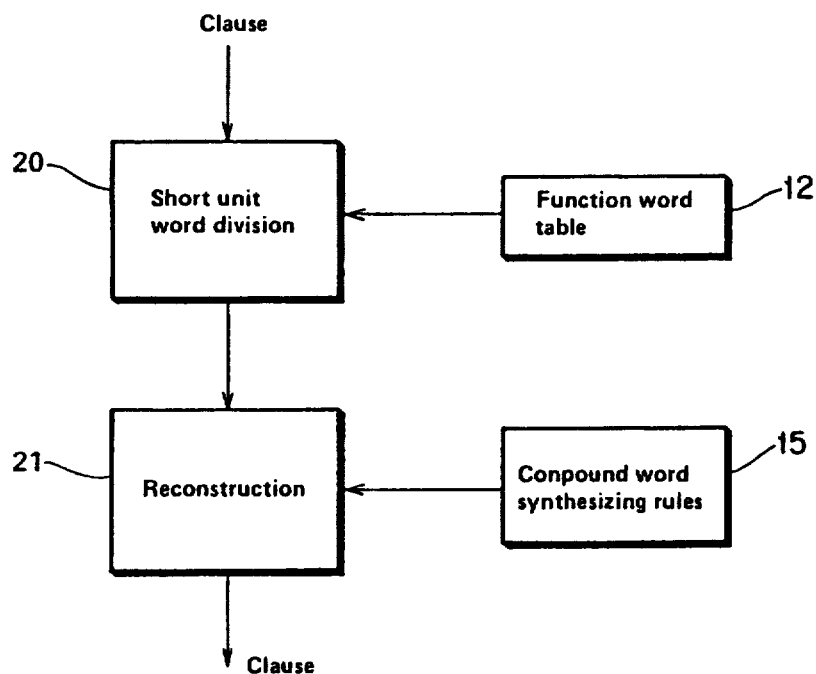
FIG. 8 is a diagram showing an execution example of the unit shown in FIG. 7.
FIG. 9 is a schematic diagram showing the detail of the fifth processing section 6 of the embodiment in FIG. 1.

The analysis of a clause "誤差の伝搬についても" (Gosanodenpannitsuitemo) is demonstrated in FIG. 8 ("伝搬" (denpan) is assumed to be unregistered in this example).

Since the content word "伝搬" is not included in the dictionary, the third processing section 4 has failed in analysis, only finding the character strings beginning with "誤" (go) and "の" (no), and control is passed to the fourth processing section 5.

First, the processing to determine phrases for the partial character strings beginning with each character of the clause, but, to omit extraneous processing, a bit string of the same length as the clause is prepared, and "1" is set in a place which is reachable from the previous clause candidate and where a clause exists.

In FIG. 8, as to the bits of the left end, the first bit corresponding to the character "誤" becomes "1" because there are two clause candidates (誤差, 誤差の). The third and fourth bits from the points reached by the two candidates are temporarily set to "1". Then, the bit string is scanned to determine a clause candidate for the character string beginning with the third character "の" where "1" is being set. As "の伝" (noden) is obtained here from the unregistered word deduction rules. A "1" is set in the position of "搬" (pan) which is next character of "伝" (den). Since the fourth bit position is ON, the next clause candidate is determined for the character string beginning with this position.

As processing proceeds to the right of the clause in this manner, the clause candidates as shown in the figure are recorded from the respective head characters and simultaneously a bit string "1011111110" is set. The quantity of eight "1's" in this bit string is employed as the approximate value of the maximum number of clauses.

When the clause candidates are scanned from the left to the right and the processing continues with one of the candidates beginning in the same place, which is to the right, "誤差の(gosano)|伝搬についても

(denpannitsuitemo)" is obtained as the first division. By applying the evaluation formula to this, an evaluation value of 48 is obtained [(8−2)× (10−2)=48]. Since the number of clauses should be 3 or less for obtaining an evaluation value exceeding this value (8−48/10=3.2 3), it is sufficient if the evaluation is performed only for those candidates having 3 or less clauses in the succeeding divisions if the maximum value does not change.

The next division obtained according to the criterion described in the preceding paragraph is "誤差の(gosano)|伝搬に(denpanni) ついても (tsuitemo)", and since the evaluation value of this is 40 ((8−3)×(10−2)=40), which is smaller than the previous value, this division is not employed.

Subsequently, the evaluation of " 誤差の (gosano) |伝搬 (denpan)|についても(nitsuitemo)" is carried out, but, since the value 40 ((8−3)×(10−2)=40) is smaller than the past maximum value, this division is also improper.

The division "誤差の(gosano)|伝搬 (denpan)| につい (nitsui)|ても(temo)" need not be evaluated and is not used because its number of clauses exceeds 3. Since subsequent divisions exceed 3, it is determined that the correct division is the first one, which is "誤差の|伝搬についても". Now, the part of speech of the unregistered word "伝搬" is decided to be "noun" from the relation between the one provided first and the succeeding function word.

In Fig. 8 the portions encircled with ( ) are function words, and the portions encircled with [] are unregistered words.

ADJUSTMENT BY THE COMPOUND WORD SYNTHESIZING RULES (FIFTH PROCESSING SECTION 6)

Adjustment must be done at this point for the following reasons.

First, in the division by the longest-match process, the clauses were set to the following three types for convenience of analysis.

Type 1: Consisting of a content word and a function word string.

Type 2: Consisting only of a content word.

Type 3: Consisting only of a function word string.

Fundamentally, clauses are considered to be of type 1, and the types 2 and 3 are extensions provided for convenience of the processing described above. For instance, the type 2 clause should create a compound word in combination with the content word in the adjoining preceding clause and/or succeeding clause. In the case of the type 3 clause, the correct interpretation is that it is joined with the function word in the preceding clause or, if the preceding clause consists only of a content word, a new clause is formed by joining the type 3 clause. With readjustment, a matched divisional result can be provided.

Second, in considering an application technique such as information retrieval, the compound word information provides a useful key. As seen in the example, it is found that "付属語解析(fuzokugokaiseki)" is a compound word which consists of three words: "付属" (fuzoku) "語" (go) and "解析" (kaiseki). Therefore, when a keyword (retrieval word) is extracted and provided from here, a word such as "付属", "付属語" (fuzokugo), "語解析" (gokaiseki) or "付属語解析" can be selected as a keyword thereby enhancing the retrieval efficiency. Also, when a machine translation is considered, if the word "付属語解析" is not found in a Japanese-English dictionary, processing is possible provided that the basic words "付属", "語" and "解析" are contained in the dictionary.

Third, by clarifying the category of the part of speech for each function word, useful information can be given at the time of preprocessing in a machine translation. For instance, if a clause "行なうことができない" (okonaukotogadekinai) is divided into "行" (a content word, a stem of a verb)+ "うことができない" (a function word string), it is impossible to generate a correct English expression corresponding to this, but, if it is divided into "行" (the stem of a verb)+"う" (a function word, conjugation ending)+ こと"koto" (a function word, formal noun)+"が" (a function word, case particle)+ "でき" (a function word, auxiliary verb representing possibility)+"な" (a function word, adjective representing negation)+"い" (a function word, inflection ending), then an output such as "can not do" can be provided as a corresponding expression.

As shown in FIG. 9, adjustment is performed by a short unit word division section 20 which performs division to short unit words (such as word base, affix and function word) and a reconstruction section 21 which performs the reconstruction by the synthesizing rules 15.

In the short unit word division section 20, division of a content word is conducted according to the divisional information registered in the dictionary with respect to that compound word. The divisional information in the dictionary consists of breaks of the short units of a content word, breaks of reading, and the attribute of each short unit (discrimination of stem, prefix and suffix).

The synthesizing rules used for reconstructing a compound word include the following.

1. An affix for making a derivative is incorporated into the preceding content word.

Example: 開(the stem of "開く"(hiraku)) +

せ (a derivative for making a transitive verb)

見け (the stem of "見ける"(akeru))

2. The part of speech of a content word is decided by the combination of a content word and a function word.
3. Noun+Noun→Compound noun
4. The stem of a one-conjugation verb+Content word →Compound word
   Example: 見 (the stem of "見る" (miru))+ 定め (sadame)→ 見定め (misadame)
5. The stem of other verb+Renyo-type conjugation ending+Content word→Compound word
   Example: 遊 +び+(bi)+ 場所 (basho) → (asobibasho) 遊び場所

EXAMPLE

Figure 10:
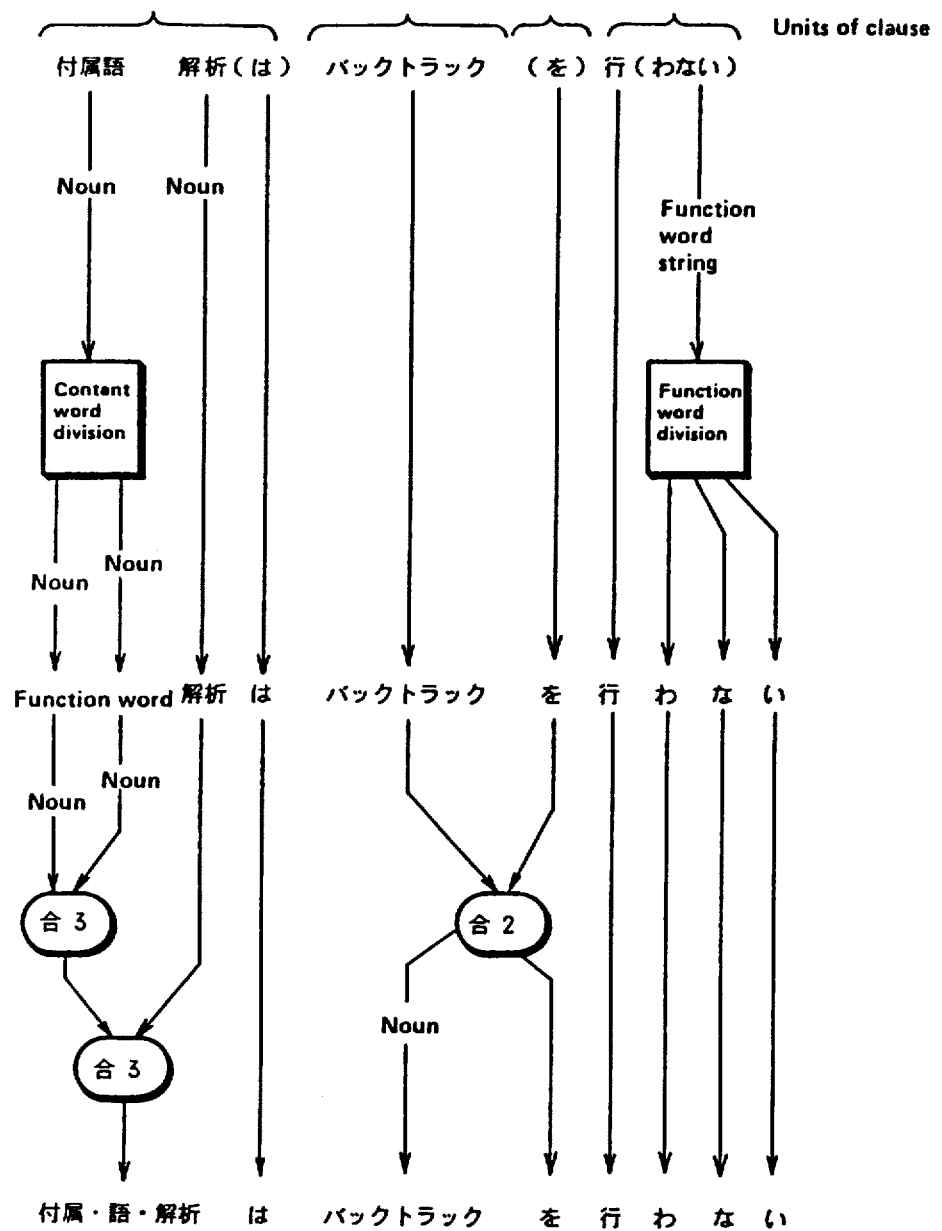
FIG. 10 is a diagram showing an execution example of the unit shown in FIG. 9.

FIG. 10 illustrates the processing which is executed in the fifth processing section 6 for an input sentence" "付属語解析はバックトラックを行わない" (fuzokugokaisekiwabakkutrakkuo okonawanai).

This input character string is divided into four clauses by the respective processing sections 2-5 (but it does not go through the fourth processing section 5). The content word division divides "付属語" (fuzokugo) into "付属" (fuzoku) and "語" (go) using the information written in the dictionary. The three function words (word strings) "は" (wa), "を" (o) and "わない" (wanai) are applied with division and allocation of a part of speech by the function word dividing section (the input sentence is divided into 10 words). After that, "付属", "語" and "解析" (kaiseki) are recognized to be a compound (合3), and the part of speech of "バックトラック" (bakkutrakku) is converged only to noun (合2).

EFFECT OF THE INVENTION

As described above, according to this invention, it has been made possible to divide a Japanese language sentence into words and to assign a part of speech to them by using only a general-purpose dictionary, without particularly registering terms used depending on the field of a document to be analyzed, whereby the processing such as management and update of the dictionary, which requires a large amount of labor, can be omitted.

While there has been described and illustrated a preferred embodiment of a Japanese language sentence dividing apparatus and method, it will be apparent to those skilled in the art that modifications and variations are possible without deviating from the broad scope of the invention which shall be limited solely by the scope of the claims appended hereto.

What is claimed is:

1. A Japanese language sentence dividing apparatus comprising:
   dictionary means containing definitions, rules, tables, and words;
   first sentence dividing means coupled to said dictionary means for dividing an inputted Japanese language sentence by referring to said dictionary means;
   detecting means coupled to said first sentence dividing means for detecting when said first sentence dividing means encounters a word which is not registered in said dictionary means;
   temporary dividing means coupled to said detecting means for dividing a character string containing at least a word which is not registered in said dictionary means into one or more realizable forms of partial character strings, each string containing at least one character, at dividing points in response to said detecting means and said dictionary means;
   means for matching each of the partial character strings located between dividing points in each of said realizable forms from said temporary dividing means with a word in said dictionary means;
   evaluation means for evaluating said realizable forms by counting the number of characters contained in said partial character string having successfully matched a word in said dictionary means, and
   a second sentence dividing means for dividing said inputted Japanese language sentence containing words which are not registered in said dictionary means, in a way that results in a best division of said sentence.

2. A Japanese language sentence dividing apparatus as claimed in claim 1, wherein said evaluation means evaluates said realizable forms by counting the number of partial character strings into which said realizable form is divided.

3. A method of dividing a Japanese language sentence comprising the steps of:
   providing dictionary means containing definitions, rules, tables and words;
   dividing, in a first sentence dividing means, an inputted Japanese language sentence by referring to said dictionary means;
   detecting when said first sentence dividing means encounters a word which is not registered in said dictionary means;
   temporarily dividing a character string containing at least one word which is not registered in said dictionary means into one or more realizable forms of partial character strings, each string containing at least one character, at dividing points in response to the detecting of a not registered word;
   matching each of the partial character strings located between dividing points in each of said realizable forms with a word in said dictionary means;
   evaluating said realizable forms by counting the number of characters contained in said partial character string having successfully matched a word in said dictionary means, and
   dividing, in a second sentence dividing means, said inputted Japanese language sentence containing words which are not registered in said dictionary means, in a way that results in the best division of said sentence.

4. A method of dividing Japanese language sentence as claimed in claim 3, wherein said evaluating said realizable forms counts the number of the partial character strings into which said realizable form is divided.

5. A Japanese language sentence dividing apparatus comprising:
   memory means;
   first sentence dividing means for dividing an inputted Japanese language sentence by character type according to character type definition and division determination rules contained in said memory means and providing a first output;
   second sentence dividing means for dividing said first output by function word strings according to a function word table contained in said memory means and providing a second output;

third sentence dividing means for dividing said second output by content word dictionary and function word table according to a content word dictionary and function word table contained in said memory means and providing a third output;

fourth sentence dividing means for dividing said third output according to unregistered word deduction rules according to the content word dictionary, the function word table, unregistered word deduction rules and affix table and connection rules contained in said memory means and providing a fourth output, and adjustment means for adjusting said fourth output by compound word synthesizing rules according to compound word synthesizing rules contained in said memory means.

6. A Japanese language sentence dividing apparatus as set forth in claim 5, wherein said fourth sentence dividing means includes evaluating means for evaluating said third output for providing a best said fourth output.

7. A Japanese language sentence dividing apparatus as set forth in claim 6, wherein said evaluating means includes counting means for counting the number of characters in said third output having matched a word in the content word dictionary in said memory means.

8. A method of dividing a Japanese language sentence comprising the steps of:

providing a memory means;

dividing an inputted Japanese language sentence by character type according to character type definitions and division determination rules contained in said memory means;

dividing the sentence divided by character type by function word strings according to a function word table contained in said memory means;

dividing the sentence divided by function word strings by content word dictionary and function word table according to a content word dictionary and function word table contained in said memory means;

dividing the sentence divided by content word dictionary and function word table according to unregistered word deduction rules according to the content word dictionary, the function word table, unregistered word deduction rules and affix table and connection rules contained in said memory means, and adjusting the sentence divided according to unregistered word deduction rules by compound word synthesizing rules according to compound word synthesizing rules contained in said memory means.

9. A method of adjusting a Japanese language sentence as set forth in claim 8, wherein said adjusting according to unregistered word deduction rules divides the sentence by counting the number of partial character strings into which the sentence is divided and performing the dividing based upon said counting.

10. A method of dividing a Japanese language sentence as set forth in claim 8, wherein said adjusting according to unregistered word deduction rules includes evaluating the sentence divided by content word dictionary and function word table for providing a best said sentence divided by unregistered word deduction rules.

* * * * *